United States Patent
Ekholm et al.

(10) Patent No.: US 9,943,786 B2
(45) Date of Patent: Apr. 17, 2018

(54) SCREEN INTAKE CLEANING SYSTEM USING VARIABLE FLOW OF INCOMPRESSIBLE LIQUID

(71) Applicant: Bilfinger Water Technologies, Inc., New Brighton, MN (US)

(72) Inventors: Michael Ekholm, Minneapolis, MN (US); Dilipkumar P. Shah, Sugar Land, TX (US)

(73) Assignee: Aqseptence Group, Inc., New Brighton, MN (US)

( * ) Notice: Subject to any disclaimer, the term of this patent is extended or adjusted under 35 U.S.C. 154(b) by 440 days.

(21) Appl. No.: 13/756,353

(22) Filed: Jan. 31, 2013

(65) Prior Publication Data

US 2013/0206706 A1 Aug. 15, 2013

Related U.S. Application Data

(60) Provisional application No. 61/594,053, filed on Feb. 2, 2012.

(51) Int. Cl.
 *B01D 21/02* (2006.01)
 *B01D 29/66* (2006.01)
 (Continued)

(52) U.S. Cl.
 CPC .......... *B01D 29/66* (2013.01); *B01D 29/68* (2013.01); *B01D 35/18* (2013.01); *E02B 9/04* (2013.01);
 (Continued)

(58) Field of Classification Search
 None
 See application file for complete search history.

(56) References Cited

U.S. PATENT DOCUMENTS 3,556,346 A * 1/1971 Steiner .......................... 222/63
3,684,176 A * 8/1972 Hruby, Jr. ..................... 239/101
(Continued)

FOREIGN PATENT DOCUMENTS

| EP | 2567743 A1 | 3/2013 |
| JP | H08-24834 A | 1/1996 |
| WO | WO 97/07869 A1 | 3/1997 |

OTHER PUBLICATIONS

Australian Patent Office, Australian Patent Application No. 2013200587 Office Action dated Aug. 15, 2014, 4 pages.
(Continued)

*Primary Examiner* — Richard C Gurtowski
(74) *Attorney, Agent, or Firm* — Patterson Thuente Pederson, P.A.

(57) ABSTRACT

A screen intake apparatus for a water intake system uses a cleaning system to clean one or more screen intakes. To clean debris from a screen, pipes in the interior of the screen receive pumped liquid (e.g., water or incompressible liquid) from a pump. Outlets, such as apertures or nozzles, on the pipes then direct the pumped liquid into the interior of the screen. One or more valves can vary, agitate, or pulse the flow of pumped fluid and/or can selectively deliver the pumped liquid to the pipes to remove collected debris from the exterior of the screen. A heater of the system can also heat the pumped liquid for delivery to the pipes to remove or prevent ice formation on the screen.

33 Claims, 12 Drawing Sheets

(51) Int. Cl.
    *B01D 35/18* (2006.01)
    *B01D 29/68* (2006.01)
    *E02B 9/04* (2006.01)
    *E03B 3/04* (2006.01)
    *E03B 1/00* (2006.01)

(52) U.S. Cl.
    CPC .................. *E03B 1/00* (2013.01); *E03B 3/04* (2013.01); *B01D 2201/084* (2013.01); *Y02E 10/22* (2013.01)

(56) References Cited

U.S. PATENT DOCUMENTS

| | | | |
|---|---|---|---|
| 3,881,209 A | | 5/1975 | Reinitz |
| 3,965,004 A | * | 6/1976 | Garber .................. 210/691 |
| 4,210,539 A | | 7/1980 | Shiban |
| 4,408,721 A | * | 10/1983 | Cohen .................. A61H 33/027 239/417 |
| 4,420,004 A | | 12/1983 | Jensen |
| 4,651,762 A | * | 3/1987 | Bowden .................. 134/111 |
| 5,062,120 A | | 10/1991 | Daly et al. |
| 5,372,153 A | | 12/1994 | Dobson |
| 5,398,363 A | | 3/1995 | Medearis et al. |
| 5,664,284 A | * | 9/1997 | Brzoska .................. A47L 7/0028 15/330 |
| 5,861,756 A | | 1/1999 | Yankielun |
| 6,174,382 B1 | | 1/2001 | Cord et al. |
| 6,206,204 B1 | * | 3/2001 | Aikawa .................. D21D 5/026 162/55 |
| 6,547,968 B1 | * | 4/2003 | Rabie .................. B01D 61/18 134/10 |
| 6,584,991 B1 | | 7/2003 | Ries |
| 6,712,959 B2 | | 3/2004 | Ekholm et al. |
| 6,746,646 B2 | * | 6/2004 | Winkler .................. 422/26 |
| 7,867,395 B2 | | 1/2011 | Ekholm et al. |
| 7,950,527 B2 | | 5/2011 | Osborne et al. |
| 2003/0085182 A1 | | 5/2003 | Wilkins |
| 2003/0155314 A1 | | 8/2003 | Gordon |
| 2007/0017549 A1 | | 1/2007 | Ekholm et al. |
| 2007/0289917 A1 | * | 12/2007 | Mylin et al. .................. 210/435 |
| 2012/0298572 A1 | | 11/2012 | Ekholm |

OTHER PUBLICATIONS

European Patent Office, European Application No. 13153771.4 Extended European Search Report dated Nov. 25, 2013, pp. 1-11.
Canadian Patent Office, Canadian Patent Application No. 2,804,617, Office Action dated Dec. 30, 2014, pp. 1-3.
Japanese Patent Office; Japanese Patent Application No. 2013-018971 Office Action dated Feb. 4, 2014, pp. 1-8.
Canadian Patent Office, Canadian Patent Application No. 2,804,614 Office Action dated Feb. 28, 2014, pp. 1-3.
European Patent Office, European Application No. 13153771.4 Partial Search Report dated May 24, 2013.
Cook Legacy Coating Company, "The Cook Book: Water Intake System Design & Technology," obtained from www.waterscreen.com, undated, 97 pages.
Cook Legacy Coating Company, "Fish Research" Introduction and Background, undated, 10 pages.
Johnson Screens, "Johnson Intake Screens: Higher Capacity and Superior Fish Protection," obtained from www.johnsonscreens.com/intake, copyright 2000, 8 pages.
Johnson Screens, "Johnson Screens High Capacity Intake Screens," obtained from www.johnsonscreens.com, copyring 2010, 4 pages.
"Evaluation Plan: USBR Flat Plate Screen at Coleman National Fish Hatchery Intake No. 3, (Contract No. 14-48-001-96044)," Mar. 1999, Prepared for US Fish and Wildlife Service, prepared by: Jones & Stokes Associates and Montgomery Watson, 44 pages.
Screen Services, "StaticOrb Screens," copyright 1999-2012.
Richards, Curtis, "Frazil Ice Intake Issues," obtained from www.env.gov.nl.ca/, undated.
Kherda, "Water Intake at New Illinois Power Plant Designed for Variable Flows," Water Wastes Digest, obtained from www.w-wdmag.com, created on Dec. 10, 2001.
Daly, Steven F., "Frazil Ice Blockage of Intake Trash Racks," Cold Regions Technical Digest No. 91-1, Mar. 1991.
Canadian Patent Office, Canadian Patent Application No. 2,804,617, Office Action dated Aug. 28, 2015, pp. 1-3.
Office Action dated Jun. 10, 2016 for Canadian Application No. 2,804,617, 4 pages.
Communication dated Oct. 26, 2016 for EP Application No. 13153771.4, 2 pages.

\* cited by examiner

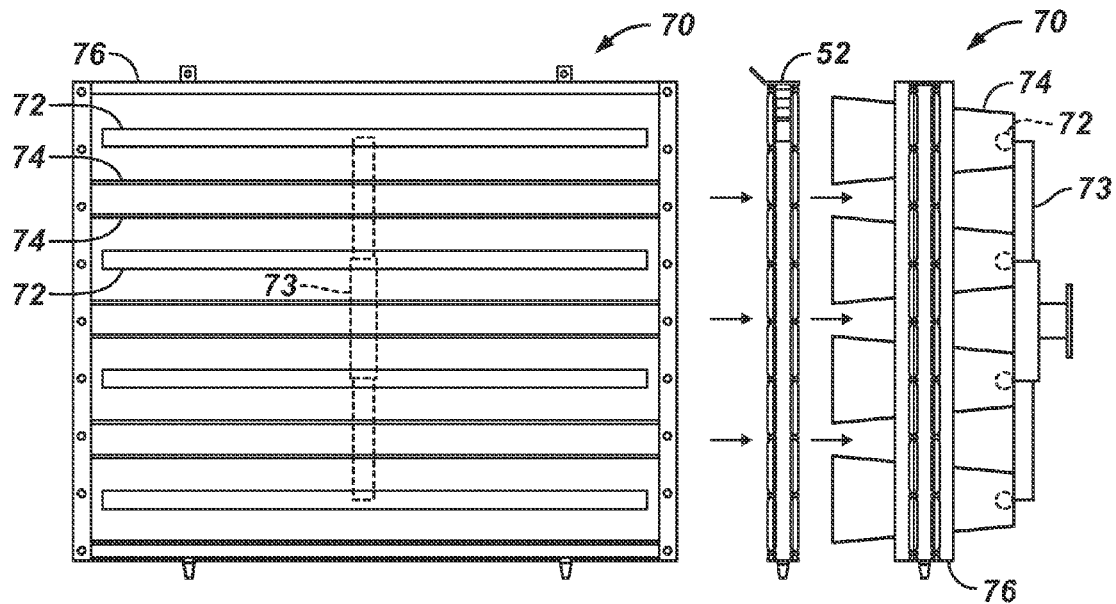
FIG. 3A (Prior Art)
FIG. 3B (Prior Art)
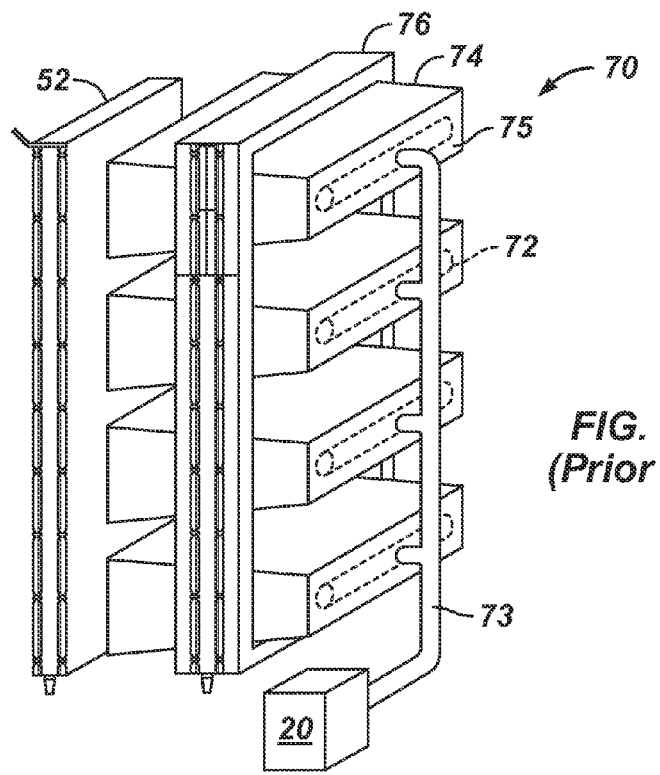
FIG. 3C (Prior Art)

SCREEN INTAKE CLEANING SYSTEM USING VARIABLE FLOW OF INCOMPRESSIBLE LIQUID

CROSS-REFERENCE TO RELATED APPLICATIONS

This application claims the benefit of U.S. Provisional Appl. 61/594,053 filed 2 Feb. 2012, which is incorporated herein by reference in its entirety.

BACKGROUND

Water intake systems use various types of screens and barriers when obtaining water from a lake, a river, or other body of water. As will be appreciated, submerged screen intakes can attract debris as floating material becomes attached to or rests on the screen's surface during operation. Eventually, this material can block the screen and reduce its flow capacity.

Several systems have been developed to clean debris from screen intakes. For example, mechanical systems that use moving brushes have been used to clear screens of debris. In addition, removable forms of screens have been used in many locations to overcome cleaning issues.

In other implementations, airburst cleaning systems can use bursts of air directed from a header to clean the screen of debris. The air cleaning system can be used on single screens or on multiple screens through a manifold of valves. In the airburst cleaning system, a compressor fills a receiver tank to store a volume of compressed air at an appropriate pressure. In a cleaning cycle, a rapid open/close valve releases the air from the receiver tank, and the released air passes through connective piping to deliver the airburst to a submerged screen intake. Within the intake, the airburst displaces several times the volume (normally 3 times the volume) of the screen.

As one particular example, Johnson Screen's Hydroburst System is an air backwash system used for cleaning cylindrical screen intakes with an airburst. FIGS. 1A-1C show a water intake system 10 having an air backwash system 20 according to the prior art for implementations where the screen intake 30 may need regular cleaning when exposed to debris or when the screen 30 is difficult to access. When operated, the air backwash system 20 flushes the debris away from the screen's surface by releasing a large volume of compressed air in a quick burst inside the screen 30.

As shown in FIGS. 1A-1B, the air backwash system 20 has a receiver tank 22 that stores compressed air and has a compressor 24 that charges the tank 22 with the compressed air. Distribution piping 28, valves 25, and the like couple the tank 22 to a header in the screen 30, and a control panel 26 controls operation of the system 20.

The cylindrical screen intake 30 shown in FIG. 1C has a tee configuration with two screens 36 on opposing ends of a central body 34. A water outlet 32 connects from the central body 34 and connects to other components of the water intake system 10. Air backwash headers 40 disposed in the screens 36 connect to an inlet pipe 42 that receives air from the air backwash system 20. When an airburst communicated from the air backwash system 20 reaches the headers 40, the resulting burst of air/water can clean the cylindrical screens 36 of debris.

Cleaning a screen with an airburst can also be used for flat screens, which can be used for a number of applications, including water intake systems and fish diversions in dam and rivers to protect fish from hydroelectric turbines and pumps. Typically, the flat screens for these applications have a low-suction velocity to protect fish and other aquatic life. Yet, debris may still collect on the flat screens.

One solution by Montgomery Watson Engineering for clearing debris from a flat screen is shown in FIGS. 2A-2B. A water intake module 50 buries in a bed of a waterway so that a portion of the module 50 sticks above the bed. The module 50 has a nose shield 54 at its upstream end. A supply pipe 56 runs from the module 50 to a water intake system, and a cleaning air pipe 60 and a buoyancy air pipe 65 run from the module 50 to components of an air supply system.

Internally, the module 50 contains flat screens 52, flow control slats 64, airburst cleaning pipes 62, floatation tanks 67, and a supply pipe connection 55. The flat screens 52, slats 64, and airburst pipes 62 situate at the top of the module 50, while the floatation tanks 67 situate at the bottom. The cleaning air pipe 60 of FIG. 2A connects to the airburst pipes 62 shown in FIG. 2B, and the buoyancy air pipe 65 of FIG. 2A connects to the flotation tanks 67 shown in FIG. 2B.

During use, water flows downward through the flat screens 52 and past the slats 64 into the module's collection chamber where the water can then travel to the supply pipe 56. The airburst pipes 62 are horizontally arranged PVC pipes located between the flat screens 52 and slats 64. These pipes 62 have small holes and distribute an airburst for cleaning the flat screens 52 when a burst of air is supplied. The slats 64 and pipes 62 have been used with horizontal modules 50 as shown in FIG. 2B, but they have also been used for vertical modules (not shown).

Another solution from Johnson Screens for clearing debris from a flat screen is shown in FIGS. 3A-3C. Here, a horizontal manifold 70 is used to clean a flat screen 52. The manifold 70 has distributor pipes 72 enclosed by troughs 74. A manifold frame 76 couples to the screen 52 or anchors by suitable stabilizing means downstream of the screen 52. Either way, the manifold frame 76 supports the deep troughs 74, which facilitate airflow from a backwash system 20 to the screen 52. As best shown in FIG. 3C, the troughs 74 have back panels 75, which can be solid as shown. Alternatively, the back panels 75 can be perforated or may not be present so water can flow through the deep troughs 74.

To provide the airflow, a conduit 73 couples from the backwash system 20 to each distributor pipe 72 enclosed in the troughs 74. Each distributor pipe 72 has a plurality of orifices (not shown) to direct a burst of air outwards toward the screen 52. When the backwash system 20 produces an airburst, for example, the air is directed from the pipes 72 and troughs 74 to the opposing screen 52 to clear debris. Water flow through the screen 52 and between the troughs 74 is shown by arrows.

Although using compressed air in the airburst systems to clean screen intakes is effective, the airburst systems release a great deal of air in a short period of time in proximity to the submerged screen intake. Depending on the body of water in which the screen is situated, there may be concerns about how the release of the airburst can cause disturbances that affect boaters or other users of the waterway or that affect nearby wildlife or fauna where the submerged screen is installed.

Blockage of screen intakes by frazil ice is another concern when the screen intakes are situated in certain bodies of waters. During winter, super cooled water (below 32F) can form small needles or pieces of frazil ice under certain weather conditions. The frazil ice can eventually coat and block a submerged screen intake. As expected, removing the frazil ice from the submerged screen can be particularly difficult.

Some techniques have been used to prevent blockage of a submerged screen intake or trash rack from frazil ice. For example, a diffused flow of heated water can be introduced into the intake system upstream of a trash rack. Alternatively, the metal trash racks or screens can be electrically heated. In another solution to minimize the buildup of frazil ice, bars composed of HDPE have been used for coarse screens, and polyethylene panels have been used for fine screens. Additionally, a warm water injection system has been used to recirculate discharge water to electric heaters and to then mix the heated discharge at the intake with the water delivered from the river. When this is done, the heated water combats the buildup of frazil ice on the intake.

Although these solutions may be effective to deal with frazil ice, they can be difficult to implement and maintain, or it may not be possible to use them in some implementations.

SUMMARY

A screen intake apparatus uses a screen cleaning system for a water intake system. A screen intake has a screen defining an interior in fluid communication with an outlet for the water intake system. To clean debris that may collect on the screen (and optionally prevent blockage from frazil ice), the apparatus has a plurality of pipes disposed in the interior of the screen and in fluid communication with pumped liquid (e.g., water or other incompressible liquid) supplied by a pump of the cleaning system. The pipes have outlets, which can be in the form of nozzles and/or apertures, disposed thereon to direct the pumped liquid from the pipes into the interior of the screen.

Inside the screen, the cleaning system has a manifold that receives the pumped liquid from an inlet and delivers the pumped liquid to the pipes. The manifold can have controllable flow devices or valves to control how the pumped liquid is delivered to the various pipes. For example, the valves can sequentially deliver the pumped liquid to the pipes or can stage the delivery in an alternating or overlapping manner. Additionally, the controllable valves can open in response to the same or different pressure thresholds to control delivery of the pumped liquid to the pipes.

To help clear the screen of debris, the system pulses the delivery of the pumped liquid and preferably varies the pulsing flow. In particular, a controller of the system controls at least one controllable flow device or valve in fluid communication between the pump and the pipes. As the controller operates it, the valve pulses the flow of the pumped liquid from the pump for delivery to the pipes and preferably varies the pulsing over time. To generate extended agitation from the variable pulsing of the pumped liquid in the screen, the system preferably delivers the pumped liquid for an extended period of time, such as several minutes and preferably from 5 to 10 minutes, which is considerably longer than the short airburst of an air cleaning system.

To help deal with frazil ice, the system can have a heater in fluid communication with the pumped liquid being delivered to the pipes. The heater heats the pumped liquid, which can help remove frazil ice and inhibit its formation during a cleaning cycle or at any point during operation of the system.

The screen can be cylindrical, and the pipes can be distributed concentrically in the interior of the screen. Alternatively, the screen can be flat, and the pipes can be arranged in a plane adjacent the screen. Either way, various arrangements of the pipes and the outlets (e.g., nozzles and/or apertures) can be used to deliver the variable pulsing flow of the pumped liquid to the screen and agitate the flow inside to clear debris from the screen's exterior. To maintain pressure of the pumped liquid as it is delivered along the length of the pipes, for example, spacing between the outlets on the pipes can decrease toward the pipes' distal ends of the pipes, or sizes of the outlets can increase toward the pipes' distal ends. Additionally, an internal diameter of the pipes can decrease toward the distal ends.

To direct the flow and create agitation or turbulence, the outlets on a given pipe can each be disposed in the same direction or in different directions along the length of the given pipe, or the outlets can be similarly or differently arranged on the various pipes. Finally, the pipes can be disposed at the same or different distances from the inside surface of the screen. These and other modifications can be used as will be appreciated with the benefit of the present disclosure.

The foregoing summary is not intended to summarize each potential embodiment or every aspect of the present disclosure.

BRIEF DESCRIPTION OF THE DRAWINGS

FIG. 3A shows a front view of another arrangement of an airburst cleaning system for a flat screen according to the prior art.

FIGS. 3B-3C show the arrangement of FIG. 3A in side and perspective views relative to a flat screen.

FIG. 9A shows side views of pipes having various aperture and nozzle arrangements.

DETAILED DESCRIPTION

Figure 4A:
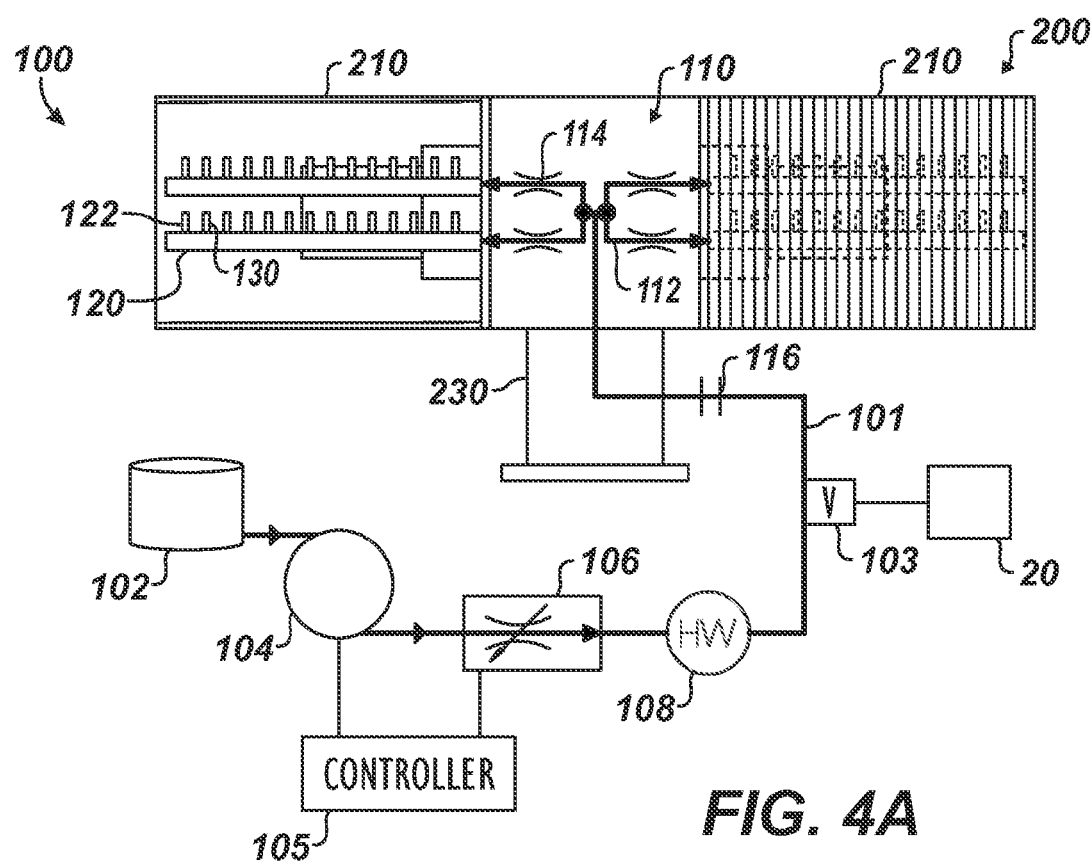
FIG. 4A shows a screen cleaning system according to the present disclosure for a screen intake system.
Figure 4C:
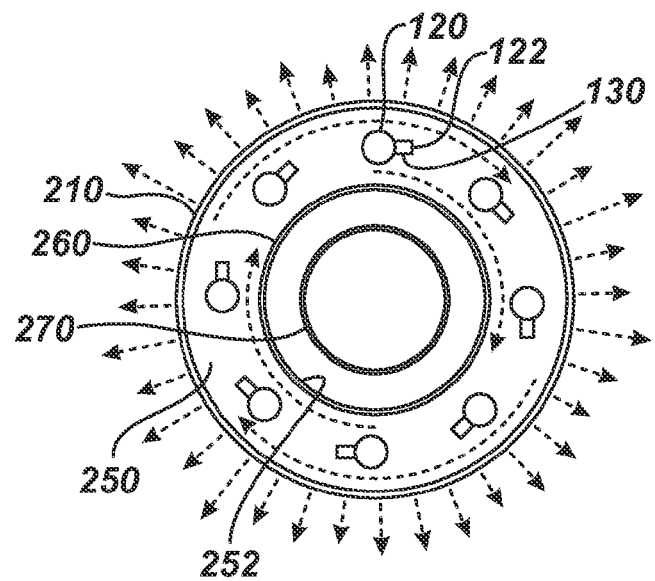
FIG. 4C shows an end view of the screen intake having components of the disclosed cleaning system.
Figure 4B:
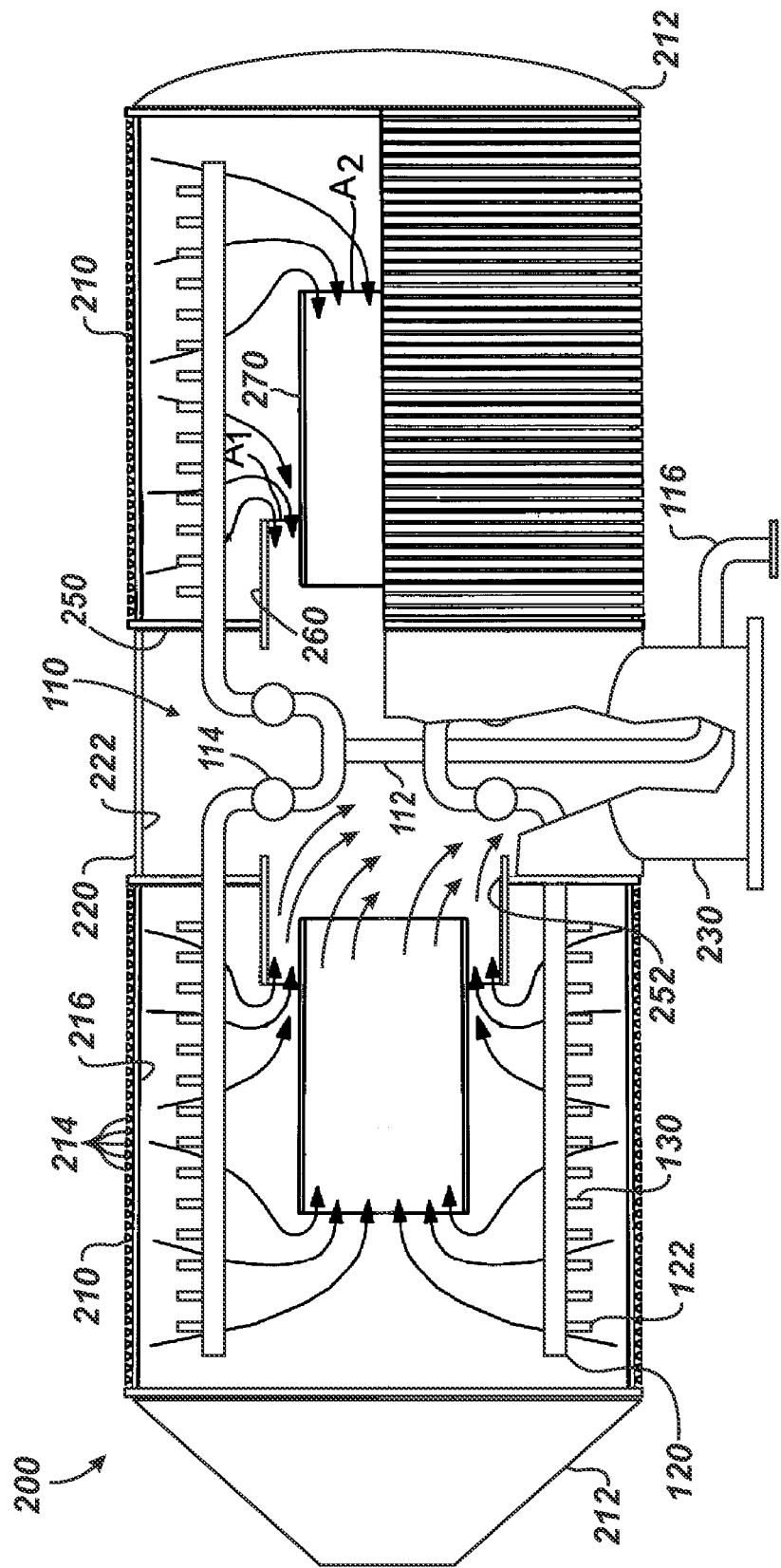
FIG. 4B shows a screen intake having components of the disclosed cleaning system.

Turning to the drawings, FIG. 4A schematically shows a screen cleaning system 100 according to the present disclosure. FIG. 4B shows a side view of a screen intake 200 in partial cross-section showing internal components of the screen cleaning system 100, and FIG. 4C shows an end view of the screen intake 200 revealing components of the screen cleaning system 100.

As shown in FIG. 4A, the screen cleaning system 100 is used with a water intake system having one or more screen intakes 200, only one of which is shown. Other components of the intake system are not shown, but are known in the art. The screen cleaning system 100 uses water (or another incompressible liquid), rather than compressed air, to clean the one or more screen intakes 200 of debris.

The screen cleaning system 100 has a liquid source 102, a pump 104, a controller 105, and agitator(s) 106. The liquid source 102 can be a dedicated tank holding water (or other liquid) for screen cleaning purposes. Reference is made herein to using water as the cleaning liquid, although any other suitable liquid can be used. Of course, the liquid used is preferably compatible with the body of water for the water intake system.

The components 102, 104, 105, 106, etc. of the cleaning system 100 may be positioned away from the screen intake 200, which is submerged in the body of water. For example, these components 102, 104, 105, 106, etc. may be disposed on shore and may connect to one or more of the submerged screen intakes 200 of the water intake system using piping. In other alternatives, these components can be submerged at or near the screen intake 200, as discussed later.

The pump 104 is a high-capacity pump capable of pumping the water from the liquid source 102 to the one or more screen intakes 200, which can be a distance from shore and can be submerged under the water's surface. As will be appreciated, the pump 104 can pump water to clean one screen intake 200 at a time by having its flow directed accordingly through piping, or the pump 104 may be able to pump water to clean more than one screen intake 200 at a time depending on the pump's capacity, the size of the screen intakes 200, piping arrangements, and other factors.

The controller 105 controls the system's operation and operates the pump 104 during a debris cleaning cycle, which may be manually or automatically instigated as the case may be. As the controller 105 actuates the pump 104 to pump water from the source 102, the controller 105 operates the agitator 106 to create a variable pulsing flow in the connecting piping 101. The agitator 106 can be one or more controllable flow devices or valves to vary, agitate, or pulse the flow of cleaning liquid. The variation of the pulsing may be random or steady depending on the agitation desired. In general, the pump 104 can provide the variable flow control internally. Alternatively, one or more flow control devices of the agitator 106 may include a flapper or elastic expansion balloon connected to the pump 104 that varies the flow of the pumped liquid from the pump 104.

In turn, the connective piping 101 delivers the variable pulsing flow of cleaning water to the screen intake 200 submerged in the body of water. If needed to deal with frazil ice, an in-line heating system or heater 108 can heat the water being pumped to the screen intake 200. The heated water can inhibit formation of frazil ice on the intake 200 as described below. The in-line heater 108 can use any of a number of methods to heat the cleaning liquid. For example, the heater 108 can use electric coils, natural gas, heat exchanger, or the like to heat the liquid being delivered from the pump 104.

As disclosed herein, the cleaning system 100 may be generally intended for using liquid water to clean the screen intakes 200. In some arrangements, the heater 108 can heat the cleaning water to create steam and heated water as desired for use in the same system 100. Being able to use steam in the system 100 may have advantages for ice removal in some cases. Any connecting piping 101 for the steam-capable system 100 is preferably insulated to reduce potential condensation in the line.

Internally, the screen intake 200 has a manifold 110 and array of delivery pipes 120 of the cleaning system 100. An inlet 116 of the manifold 110 connects to the incoming cleaning water delivered by the connective piping 101, and a distribution arrangement 112 of the manifold 110 delivers the cleaning water to the pipes 120. These components are only conceptually shown here, but it will be appreciated that piping, valves, chambers, etc. may be needed to handle the capacity of water being delivered and distributed. Some of these components are discussed below with reference to FIGS. 5A-5B.

From the distribution arrangement 112, valves or other flow control devices 114 can control the communication of the cleaning water to the various pipes 120 arranged within the screens 210 of the intake 200. The pipes 120 extend laterally in the interior of the screens 210 adjacent insides surfaces of the screens 210. Preferably, the pipes 120 have outlets 122 arranged along their length to give the variable pulsing flow of the cleaning water directionality within the screens' interiors, as discussed later.

The outlets 122 can be nozzles 130 as shown, although apertures can also be used as discussed later. Any suitable type and shape of nozzle 130 can be used and can be affixed on the pipe 120 to communicate with the pipe's internal bore through a port (not visible) in the pipe 120. The distal ends of the pipes 120 are preferably closed so that flow through the pipe's bore exits exclusively through the ports with affixed nozzles 130.

Further detail of the screen intake 200 and components of the screen cleaning system 100 are shown in FIG. 4B. The screen intake 200 has a tee configuration with two cylindrical screens 210 disposed on opposing ends of a central body 220, although other configurations can be used. A water outlet 230 connects from the central body 220 for connecting to other components (not shown) of the water intake system. The central body 220 has a cylindrical sidewall and opposing end walls 250 that define a hollow 222 therein. Both end walls 250 have a central opening 252 receiving flow from one of the screens 210 during operation so the flow of water can pass through the outlet 230 to the rest of the water intake system.

Both screens 210 have open ends connected to the body's end walls 250 and have closed ends caps 212 that may be shaped to deflect debris. Each of the screens 210 is cylindrical in shape and defines a plurality of slots for keeping out debris as water enters into the screen 210. The slots can be either transverse or parallel to the axis of the screen 210. Preferably, spaced wraps of profiled wire 214 form the slots on the cylindrical surfaces of the screens 210, although the screens 210 can also be a solid pipe member with slots formed therein. The profiled wire 214 is preferably wedged or Vee-shaped with a wider base of the wire 214 facing outward to enhance the sliding of debris over the screens' surfaces. For example, the profiled wire 214 can be VEE-WIRE® available from Johnson Screens. (VEE-WIRE is a registered trademark of Weatherford/Lamb, Inc.). In one implementation and as shown in FIG. 4B, a plurality of these profiled wires 214 are circumferentially wrapped and welded to lateral support bars 216 to form the screens 210 using techniques known in the art.

Depending on the implementation, the central passages 252 in the end walls 250 may be sufficient to control the flow velocity at the screen's surfaces to maintain a preferred surface flow velocity for the water intake system. However, each end wall 250 can have a flow modifier disposed in its central opening 252 to further control the flow velocity. To that end, the screen intake 200 can use flow modifiers having one or more pipes disposed in the openings 252 and partially inside the screens 210 to communicate fluid from inside the screens 210, through the openings 252 in the end walls 250, and into the hollow 222 of the central body 220. For example, the intake 200 can use single flow pipes for the flow modifier disposed in the openings 252, or the intake 200 as embodied in FIG. 4B can use double flow pipes 260 and 270 nested inside one another in the openings 252. Further details of the design of the flow modifiers are disclosed in U.S. Pat. No. 6,051,131, which is incorporated herein by reference in its entirety.

The internal manifold 110 is preferably disposed in the intake's central body 220 and has an inlet 116, which receives the variable pulsed cleaning liquid from the screen cleaning system 100. The distribution arrangement 112 of the manifold 110 delivers the cleaning water to the pipes 120 passing through the screen's end walls 250 to the screens' interiors. Passing along the pipes 220 inside the screens 210, the variable, pulsed cleaning liquid exits the outlets 122 (e.g., nozzles 130) to clean the screens 210 of debris on their external surfaces.

As best shown in the end view of FIG. 4C, the pipes 120 can be arranged concentrically around the interior of the screen 210 adjacent the inside surface of the screen 210. The pipes 120 extend from the end wall 250 in the space between the surrounding screen 210 and the flow opening 252 with its modifiers 260 and 270. As also shown, the nozzles 130 on the pipes 120 can be arranged pointing all in approximately the same direction—i.e., tangential to the circumference of the screen 210 in this depiction.

Figure 1A:
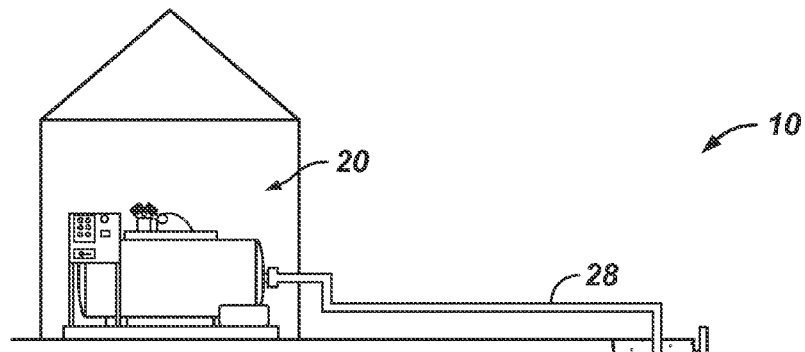
FIG. 1A shows a water intake system having an airburst cleaning system according to the prior art.
Figure 1B:
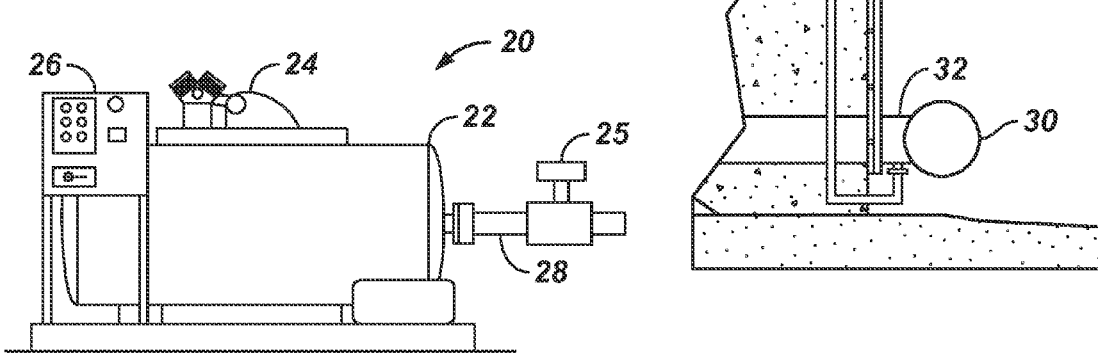
FIG. 1B shows components of the prior art airburst cleaning system in more detail.
Figure 1C:
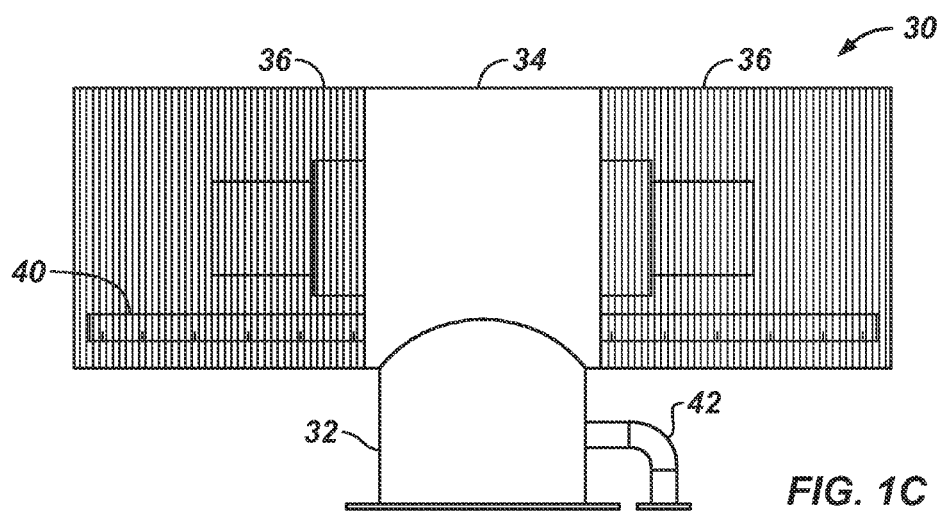
FIG. 1C shows a cylindrical screen intake with a header for the prior art airburst cleaning system.
Figure 2A:
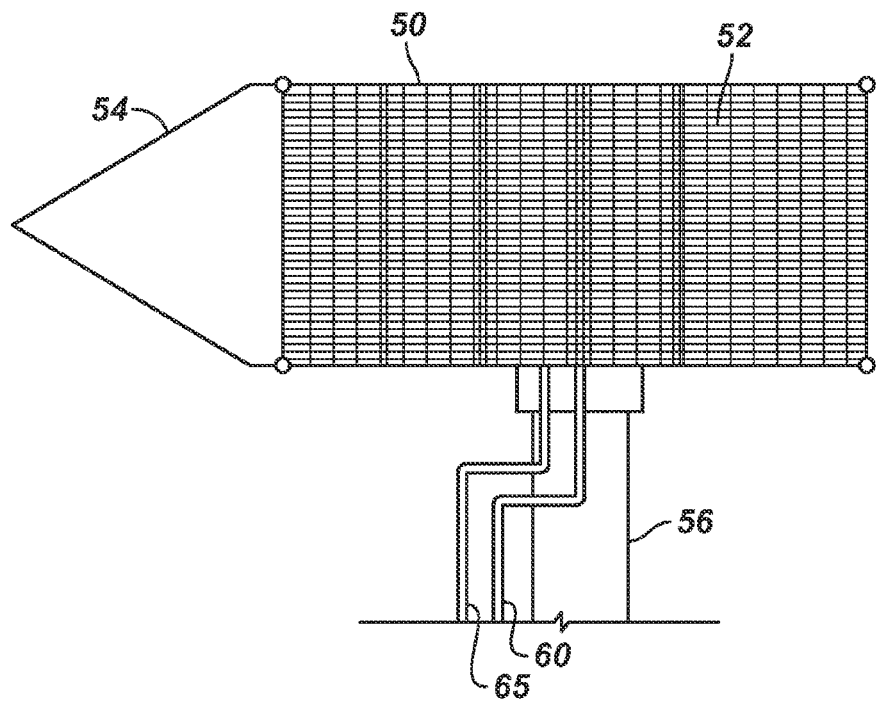
FIGS. 2A-2B show one arrangement of an airburst cleaning system for a flat screen according to the prior art.
Figure 2B:
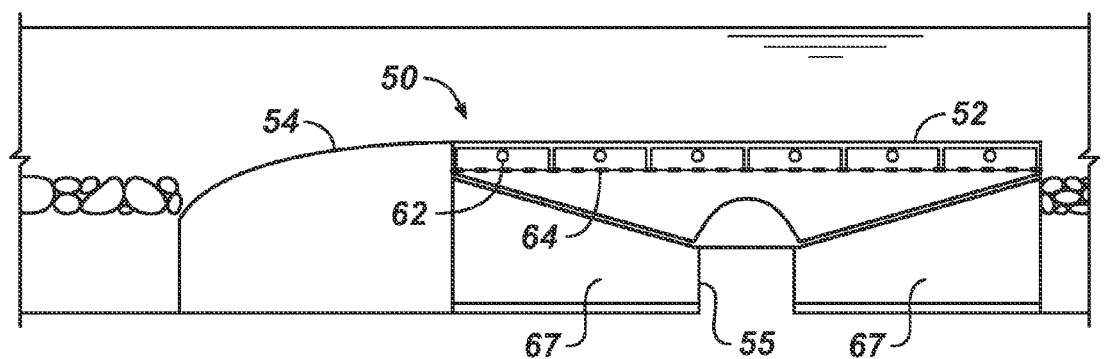

In the previous discussion, the screen cleaning system 100 has been described for use with pumped liquid, such as water. The pipes 120, nozzles 130, manifold 110, and other components of the disclosed system 100 can be used with compressed air supplied by an airburst system. To do this, a selective connection or valve 103 as shown in FIG. 4A can selectively connect the connective piping 101 between the liquid-based system 100 and an airburst system 20, such as described previous with reference to FIGS. 1A-1B. In this way, operations can be switched between using variable pulsing flow from the pump 104 and agitator 106 of the liquid-based system 100 of the present disclosure and using airbursts from the compressed air tank (22) and valves (25) of the air-based system (20) of FIGS. 1A-1B. Moreover, if a foam, mist, fluid, or the like is intended to be dispersed inside the screens 210, then the selective connection 103 can be set so as to combine the liquid-based system 100 (having liquid for foam, mist, etc.) and the air-based system (20) (having the air or other gas) to propel the foam, mist, fluid, or the like through the connective piping 101 to the screen intake 200.

Having an understanding of the cleaning system 100 and its components inside and outside a screen intake 200, discussion now turns to how the system 100 can remove debris from the intake 200 and deal with the collection of frazil ice. As mentioned previously, the variable pulsing flow of cleaning liquid delivered by the system 100 pulses in the internal volume of the screens 210 and acts to remove debris from the outside surfaces of the screens 210. The outlets 122 can be arranged to create a pulsing flow effect in the internal volume of the screens 210 in a number of ways, such as discussed below. As the pulsed liquid from the pump 104 of the system 100 flows out of the pipes 120 and outlets 122, for example, the flow tends to produce turbulent, whirling, or rotating flow inside the screen's interior. The cleaning liquid moves within the screens 210 and passes out through them, agitating external debris that may have collected on the screens 210 to clear the screen intake 200 of the debris.

The screen cleaning system 100 applies the variable pulsing liquid over an extended period of time to clear debris. For example, the system 100 can pulse liquid for several minutes, preferably about 5-10 minutes, for one screen intake 200. This time frame is considerably longer than the 6-10 second bursts of an airburst cleaning system of the prior art. Because the pipes 120 are arranged laterally along the lengths of the screens 210, the pulsed liquid communicated from the manifold 110 travels down the pipes 120 from the proximal end of the screen 210 to the distal end. The variable pulsing of the liquid can therefore tend to sweep along the length of the screen 210, which may be further beneficial in removing debris.

As hinted to previously, the disclosed cleaning system 100 may also be more effective than the prior art airburst cleaning system in preventing formation of frazil ice. As is known, frazil ice consists of small crystals of ice that form in super cooled waters when turbulence prevents the ice from coagulating. In a water intake system, crystals of frazil ice can be brought to the depth of the screen intake 200, and the frazil ice adheres to the intake 200. Overtime, the frazil ice forms a collection of protruding ice shards on the outer surfaces of the screens 210, which can block the flow of intake water into the screen intake 200 considerably.

The extended agitation of the cleaning liquid during a cycle can inhibit formation of the frazil ice by keeping frazil ice from adhering to the screen 210. Likewise, heating the cleaning liquid with the in-line heater 108 can help prevent formation of the frazil ice and potentially remove it during the cycle. In addition to the standard cleaning cycle, the disclosed system 100 can be operated in a frazil ice operation when temperatures warrant. In this operation, the system 100 can be operated to agitate the variable, pulsing, and heated liquid inside the screen intake 200 to inhibit blockage from frazil ice, preventing the frazil ice from adhering to the screens 210 and forming blockages.

Figure 5A:
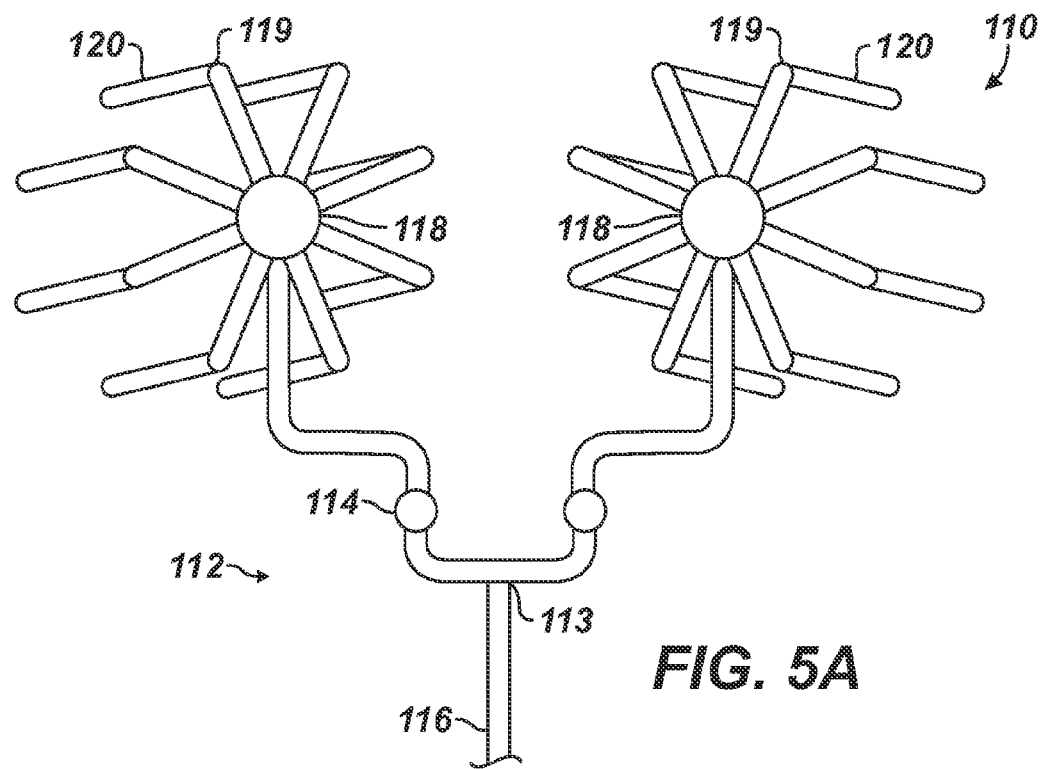
FIG. 5A shows components of a manifold for the disclosed cleaning system.
Figure 5B:
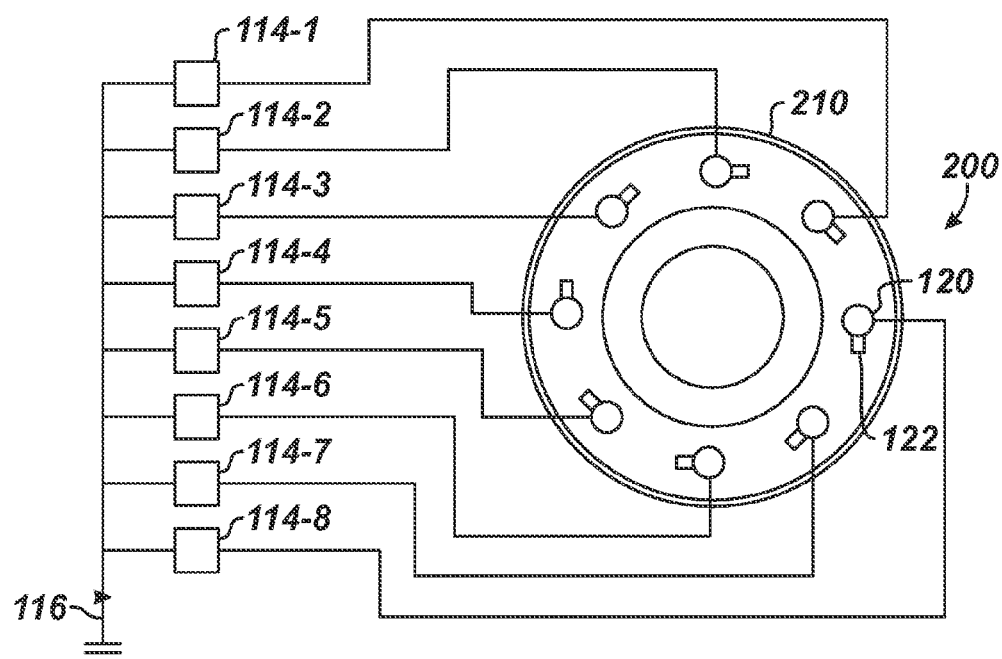
FIG. 5B shows an arrangement of valves for distributing cleaning liquid to the pipes of the disclosed cleaning system.

Before turning to various arrangements of pipes 120 and outlets 122 used to create agitating flow inside the screens 210, discussion first turns to details of the manifold 110 inside the screen intake 200. FIG. 5A shows components of the manifold 110 for the disclosed cleaning system, and FIG. 5B shows an arrangement of internal valves 114 for distributing pumped liquid to the pipes 120 in the screen intake 200. As shown in FIG. 5A, the inlet 116 delivers the pulsing flow of the pumped liquid to the distribution arrangement 112, which can have a Tee 113. Flow split from the Tee 113 travels to headers 118, which are preferably incorporated into the end walls (250; FIG. 4B) of the screen intake (200). From the headers 118, elbows 119 connect the flow to the various pipes 120, which dispose laterally inside the screens (210). As will be recognized, the components of the manifold 110 preferably do not restrict flow of intake water through the openings (252) in the end walls (250) so the actual arrangement of the manifold's components may be different inside the intake (200) than schematically depicted here.

In general, flow from the inlet 116 can be equally distributed by the headers 118 to the pipes 120 inside the screen intake (200). In this way, the pipes 120 can each be pulsed with the pumped liquid at the same time. Valves 114 may prevent backwash of intake water through the pipes 120 and/or may be used to direct the flow of pumped liquid to one or both of the headers 118.

Alternatively, as shown in FIG. 5B, valves 114 in the screen intake 200 can control how the variable pulsing flow of the pumped liquid is delivered to the pipes 120. The valves 114 can be incorporated into the headers 118, the elbows 119, the pipes 120, or the like. In this arrangement, the valves 114 can be configured to supply the pumped liquid in an alternating manner such that one or more of the pipes 120 deliver the variable pulsing liquid inside the screen 210 while other pipes 120 are closed.

In particular, flow from the system's pump (104) entering the inlet 116 is distributed to the valves 114 of the manifold 110. The valves 114 operate based on time intervals, switching between on and off states. Various types of valves 114 can be used, including electrical, hydraulic, and mechanically actuated valves. Preferably, the valves 114 are check valves activated by the pressure from the pumped liquid to initiate their time intervals.

During the cleaning cycle, the first valve 114-1 opens for a first time interval (e.g., 10 to 30 seconds) and then closes. The second valve 114-2 can then open for the same or different time interval and then close. The process repeats through all of the valves 114-1 through 114-8 and can be repeated multiple times. The opening and closing of the valves 114 can be sequentially performed one after the other; they may overlap with one another; and they may vary in sequence between the various pipes 120. The desired effect is to produce agitation within the screens 210 to clear debris from the exterior.

Figure 6A:
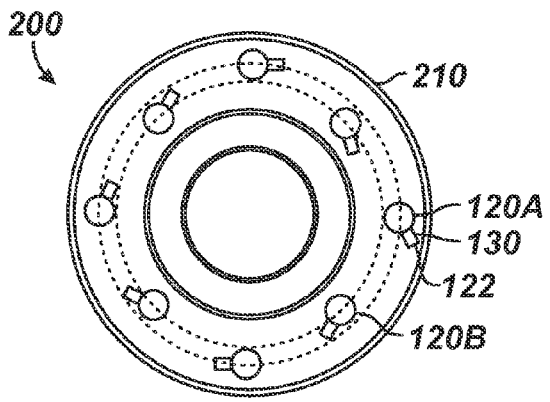
FIGS. 6A-6D show end views of the screen intake having various piping and outlet arrangements.

As mentioned previously, various arrangements of outlets 122 can be used for the pipes 120 inside the screen intake 200 to create the desired flow, agitation, or turbulence to force debris off the outer surfaces of the screens 210. FIGS. 6A-6D show end views of the screen intake 200 having various arrangements of pipes 120 and outlets 122. As shown in FIG. 6A, the outlets 122 in the current examples include nozzles 130. The nozzles 130 on the pipes 120 can be oriented in different directions (i.e., at different angles) relative to the inside surface of the screen 210. Therefore, some nozzles 130 can point tangentially; others can point more centrally; while others may point outward more toward the inner surface of the screen 210. Additionally, some pipes (e.g., 120A) may be located closer to the inside of the screen 210, while other pipes (e.g., 120B) may be located further.

Figure 6B:
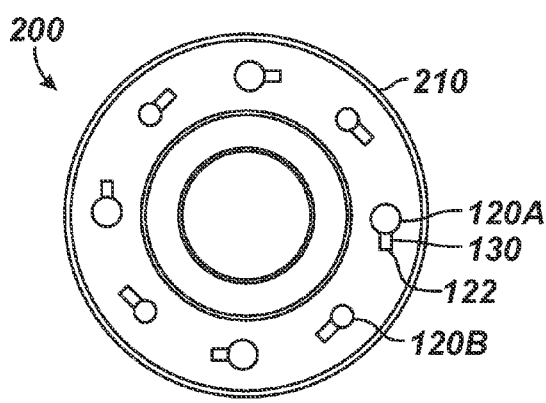
Figure 6C:
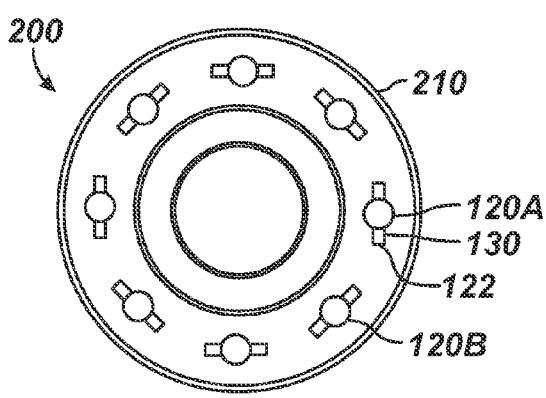
Figure 6D:
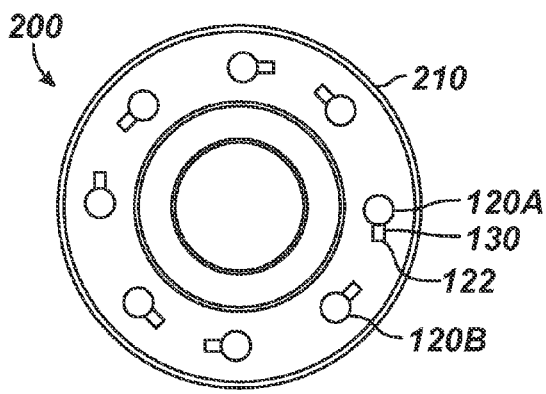

As shown in previous arrangements, the pipes 120 may all be of the same size. Alternatively, as shown in FIG. 6B, the pipes 120 may be of different diameters. In this way, one set of pipes (i.e., pipes 120A) can be used to deliver the pulsed liquid at one (lower) pressure, while the other set of pipes (i.e., pipes 120B) can be used for another (higher) pressure. For this arrangement, the valves (114; FIG. 5B) at the manifold 110 can be controllable so that they open in response to certain pressure thresholds. For example, the valves (114) can be spring-loaded check valves that open under a predetermined pressure. Finally, as shown in FIGS. 6C-6D, the nozzles 130 can be arranged to point in both opposing directions, tangential to the circumference of the screen 200 or at other angles.

Figure 7A:
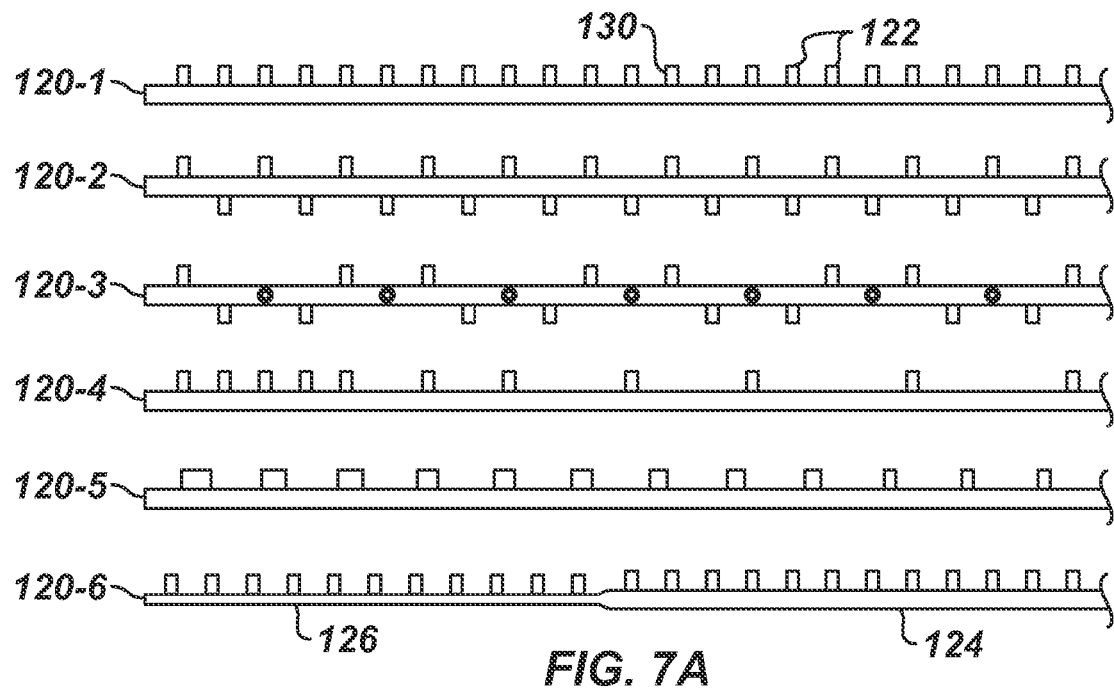
FIG. 7A shows side views of pipes having various outlet arrangements.
Figure 7B:
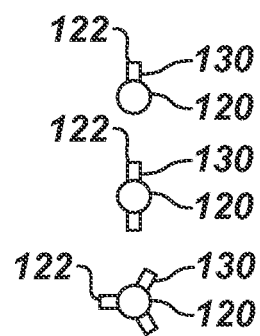
FIG. 7B shows end views of pipes having various outlet arrangements.

As shown in FIGS. 7A-7B, the pipes (e.g., pipes 120-1, 120-2, and 120-3) can have the nozzles 130 distributed evenly along the length of the pipe 120. Additionally, the pipes 120 can having nozzles 130 pointed in one direction (e.g., pipe 120-1), in two directions (e.g., pipe 120-2), or in multiple directions (e.g., 120-3).

To enable pumped liquid to be delivered down the length of the pipes 120 at suitable pressure, the spacing of the nozzles 130 may decrease toward the distal end of the pipe (e.g., 120-4); the sizes the nozzles 130 may increase toward the distal end of the pipe (e.g., 120-5); and/or the internal diameter of the pipe (e.g., 120-6) may decrease toward the distal end. These and other arrangements of the pipes 120 and nozzles 130 in FIGS. 6A through 7B can be used, and the various arrangements can be combined together as desired.

Figure 8A:
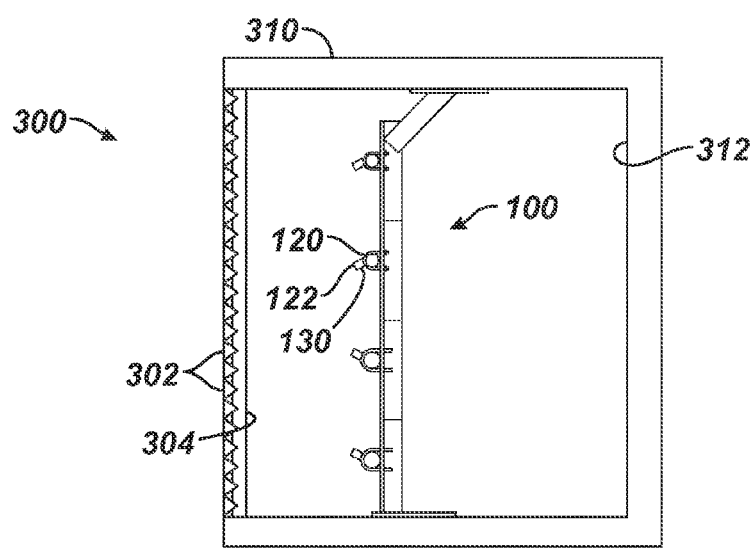
FIG. 8A shows a flat screen of a water intake system having pipes and outlets of a screen cleaning system according to the present disclosure.

Although the screen cleaning system 100 has been described for use with a cylindrical screen intake 200, the system 100 can be used with flat screen intakes arranged either horizontally or vertically in a body of water. For example, FIG. 8A shows a flat screen 300 disposed on an open end of an enclosure 310. The flat screen 300 is composed of parallel wires 302 attached to rods 304 arranged perpendicular thereto. The wires 302 can be profiled wire or any other suitable type of wire for a screen, filter, diversion panel, trash rack, or the like. The enclosure 310 is only schematically depicted for illustration purposes and may have one or more outlets (not shown). Depending on the implementation, the enclosure 310 can be any suitable module, component, pipe, conduit, outlet, inlet, or the like for a water intake, filtration, diversion, or other type of system.

As shown in FIG. 8A, the flat screen 300 covers the interior 312 of the enclosure 310 and can be situated horizontally as shown, although any orientation may be used. Either way, the flat screen 300 may collect debris carried by water passing through the screen 300 into the interior 312 of the enclosure 310. To clear the debris (and optionally prevent frazil ice), the pipes 120 with outlets 122 of the screen cleaning system 100 of the present disclosure dispose parallel to the screen 300. The pipes 120 are disposed in a plane adjacent the flat screen 300 and connect to the other components of the system 100 in a manner described previously. As shown here, the outlets 122 include nozzles 130, although apertures could be used as described later.

Figure 8B:
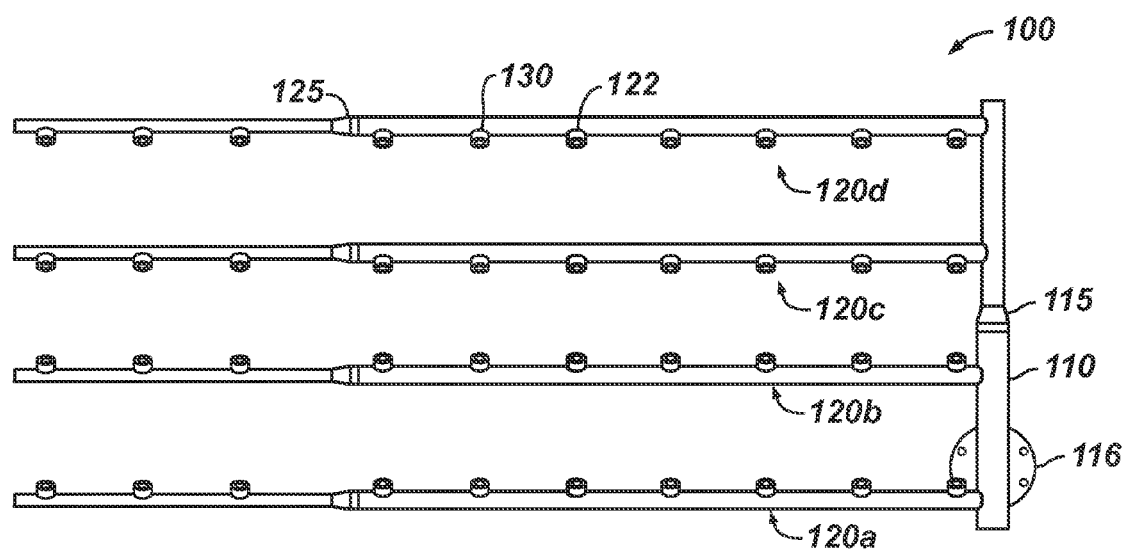
FIG. 8B shows a front view of an arrangement of pipes and outlets for the cleaning system in FIG. 8A.

FIG. 8B shows one arrangement of the pipes 120 and nozzles 130 for the flat screen 300 of FIG. 8A. A manifold 110 includes a reducer 115 disposed between a proximal end (connected to an inlet 116 and some of the pipes 120*a-b*) and a distal end (connected to the other pipes 120*c-d*). The diameter (or flow area) of the manifold 110 changes at the reducer 115 as pumped liquid from the cleaning system enters the inlet 116.

Four pipes 120 *a-d* are shown, but more or less could be used. Moreover, the pipes 120 *a-d* can branch off in opposing directions from the manifold 110. In the particular example shown in FIG. 8B, the (two lower) pipes 120 *a-b* have their proximal ends connected to the manifold's larger portion and have a larger diameter (or flow area) compared to the (two upper) other pipes 120 *c-d*, which have their proximal ends connected to the manifold's smaller portion. The pipes 120 *a-d* also include reducers 125 at about three-fourths of the length of the pipes 120 *a-d* in which the diameter (or flow area) of the pipes 120 *a-d* decreases toward the pipes' distal ends. The reducers 115/125 and different diameter pipes 120 *a-d* are intended to control the flow of liquid exiting the nozzles 130 disposed down the length of the pipes 120 and maintain suitable pressure for the flow.

The nozzles 130 can have a number of arrangements on the pipes 120, being either directed all in the same direction on all of the pipes 120, having different directions on the same pipe 120, having the same or different sizes, etc. Likewise, the pipes 120 can have different diameters from one another, different distances relative to the flat screen 310, extend from different sides of the manifold 110, etc. Accordingly, the teachings applied previously with respect to the pipes 120 and nozzles 130 for the cylindrical screen (200) can apply equally to the flat screen 310 and visa-versa so the details are not repeated here.

In previous embodiments, the outlets 122 on the various pipes 120 for the cylindrical screen 210 and flat screen 310 have used nozzles 130 exclusively to direct the flow. In addition to the nozzles 130 (or in the alternative), all or some of the outlets 122 on the pipes 120 may use ports, slots, openings, perforations, or other apertures to direct the flow of the pumped liquid. As shown in FIG. 9A, for example, the outlets 122 on the pipes (e.g., 120-7, 120-8) can use apertures 135 in the form of round openings or thin slits, although other shapes could be used. Although the slit shape of the apertures 135 are directed laterally, they could be oriented in other directions including longitudinally. Additionally, the pipes (e.g., 120-9) can have a combination of apertures 135 and nozzles 130 for the outlets 122.

Figure 9B:
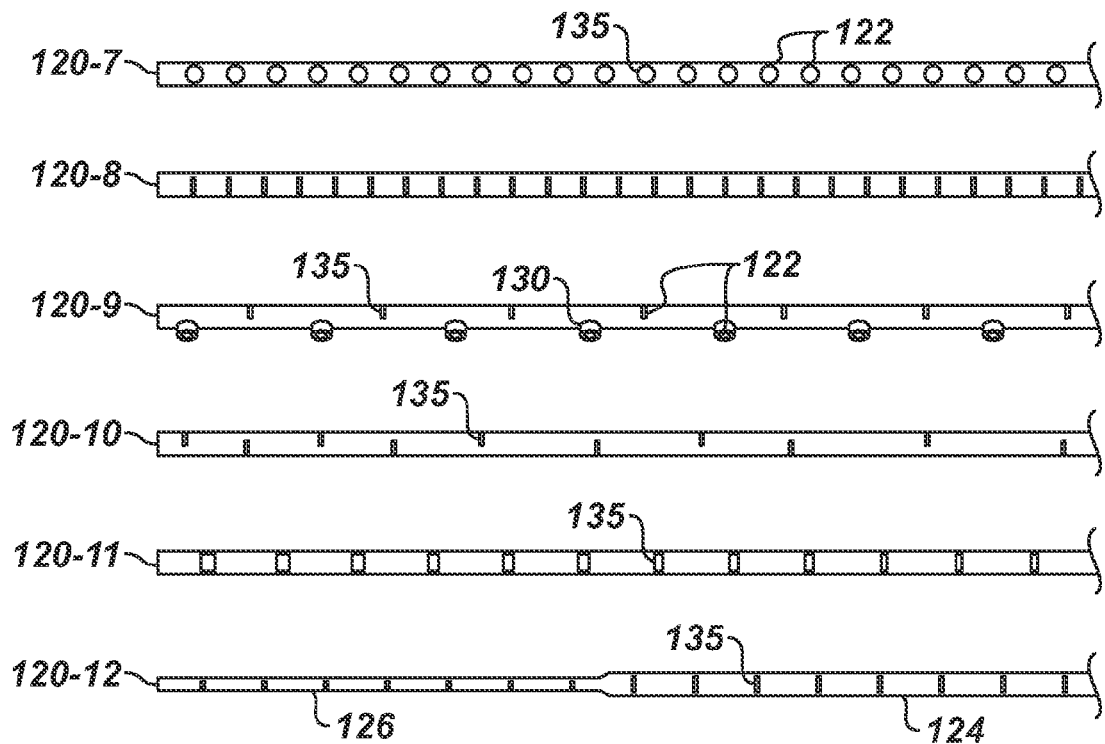
FIG. 9B shows end views of pipes having various aperture and nozzle arrangements.
Figure 9B:
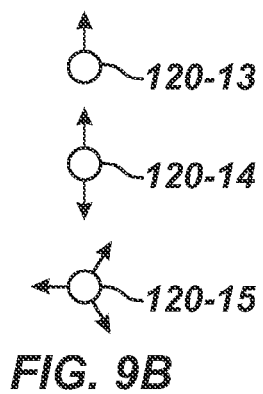

As shown in FIGS. 9A-9B and as detailed previously, the pipes 120 can have the apertures 135 (and nozzles 130 if present) directed in the same direction (e.g., pipes 120-7, 120-8, 120-13), in opposing directions (e.g., pipe 120-14), or in multiple directions (e.g., pipes 120-15). Moreover, as detailed previously, the pipes 120 can have the apertures 135 (and nozzles 130 if present) distributed evenly along the pipe's length (e.g., pipes 120-7, 120-8, and 120-9), spaced differently from one another (e.g., 120-10), and/or sized differently from one another (e.g., 120-11). Likewise, the internal diameter of the pipe (e.g., 120-12) may decrease toward the distal end when apertures 135 are used. These and other arrangements of the pipes 120, nozzles 130, and apertures 135 in FIGS. 9A-9B can be used, and the various arrangements can be combined together as desired.

Figure 10:
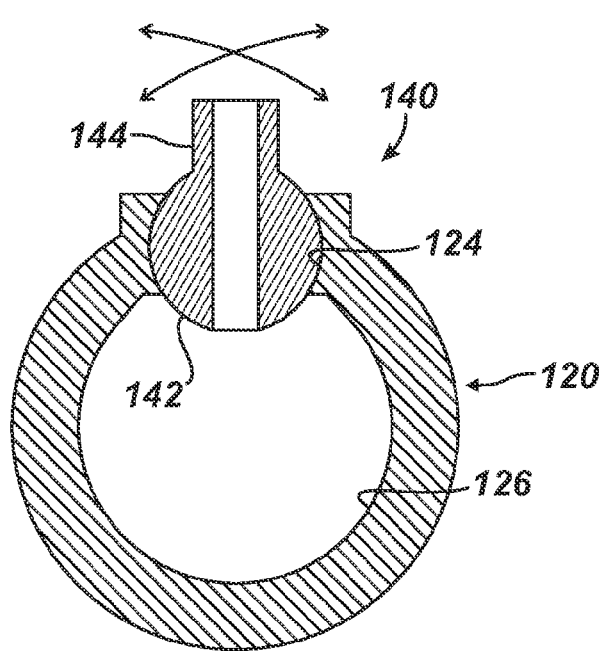
FIG. 10 shows a cross-section of a movable nozzle for an outlet of a pipe of the disclosed cleaning system.

In addition to the outlets 122 having nozzles 130 and apertures 135, movable nozzles can be used for the outlets on the pipes 120 for the cleaning system 100. FIG. 10 shows an example of a movable nozzle 140 for use on a pipe 120. The nozzle 140 has a ball end 142 and a nozzle end 144. The ball end 142 can rotate in a socket 124 of the pipe 120 so the nozzle end 144 can direct fluid from the pipe's internal passage 125 to the interior of the screen (not shown). The movable nozzle 140 can be fixed in a set orientation and remain set during operation using fastening means or friction, or the nozzle 140 may move randomly during a cleaning cycle as the pumped liquid exits the nozzle end 144 and flow pivots the nozzle 140 in the socket 124.

In previous embodiments, the system 100 uses manifolds 110, distribution arrangement 112, valves 114, pipes 120, and the like inside the screen intake 200 to deliver the cleaning liquid from the pump 104 to the screen intake 200. As an alternative, several separate pipes 120 leading from one or more separate pumps 104 can be used instead of the manifold 110, distribution arrangement 112, valves 114, and the like. The separate pipes 120 can run individually to the intake screen 200 from the shore or other pumping location. This would allow for individual sections of the screen 200 to be backwashed rather than just the entire screen 200. Yet, as noted previously in FIG. 4A, rather than using individual pipe connections, separate activation of the pipes 120 can still be accomplished by using internal valves 114 to isolate an individual or specific set of the pipes 120 during the cleaning operation.

As noted previously, components of the system 100, such as the source 102, pump 104, agitator 106, etc. may be positioned away from the screen intake 200 and may be positioned on shore. In other alternatives, these components can be submerged at or near the screen intake 200, as discussed below with reference to FIGS. 11A through 12.

Figure 11A:
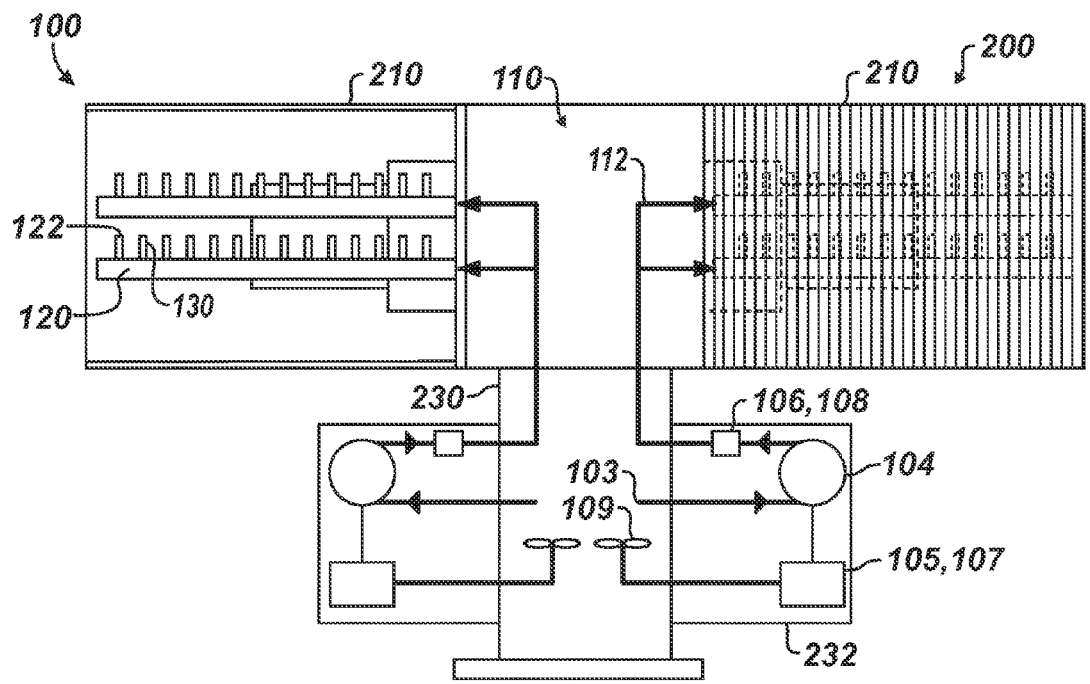
FIG. 11A shows a submerged screen cleaning system according to the present disclosure for a screen intake system.
Figure 11B:
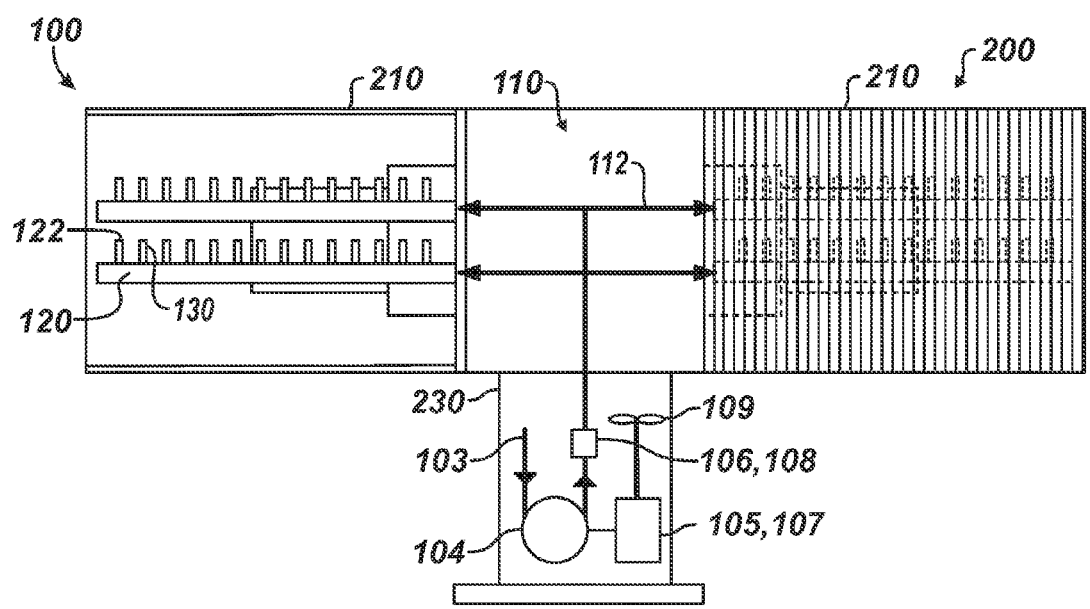
FIG. 11B shows another submerged screen cleaning system according to the present disclosure having submerged components for a screen intake system.

FIGS. 11A-11B show a submerged screen cleaning system 100 according to the present disclosure for a screen intake system. The system 100 is similar to those disclosed previously so like reference numerals are used for comparable components. As can be seen here, the submerged pump 104, agitator 106, and heater 108 can be incorporated into the screen intake 200 itself. As shown in FIG. 11A, for example, the components can be disposed in an additional housing or pod 232 attached to the screen intake 200. Alternatively, as shown in FIG. 11B, the components can be housed inside the existing body of the screen intake 200, such as in the outlet 230 or other location, if space is available. In general, any housing for the components can be attached anywhere on the screen intake 200 that is convenient. As shown, the controller 105 may be located with the other components, although it or any of the components could be located separately.

The screen cleaning system 100 can use separate pumps 104, agitators 106, heater 108, and other related equipment for separate pipes 120 and screens 210, as shown in FIG. 11A. Alternatively, one set of pump 104, agitator 106, heater 108, and other related equipment can be used for multiple pipes 120 and screens 210, as shown in FIG. 11B.

In both arrangements of FIGS. 11A-11B, the submerged pump(s) 104 have a pump intake 103 that communicates with the water screened by the screen intake 200 so the system 100 uses the intake water to clean debris from the screens 210 during a cleaning cycle. This is not strictly necessary because the pump intakes 103 can communicate by separate piping to a remote reservoir (not shown) of cleaning liquid submerged in the body of water or disposed onshore. Additionally, the pump intake 103 can communicate directly with the body of water outside the screen intake 200 to obtain cleaning water, although a separate screen or filter may be needed to prevent debris from entering the pump(s) 104.

The pump 104, agitator 106, heater 108, and other related equipment of the system 100 can be powered directly by connecting to power lines (not shown) form an onshore or other power source. Alternatively, a local power supply 107, such as a battery, can be incorporated into the system 100 as shown in FIGS. 11A-11B. The local power supply 107 can be a replaceable power source or can be rechargeable using an external power source (not shown). Alternatively, the local power supply 107 can be a rechargeable, self-charging power source. For example, self-charging components for the power supply 107 can include an impeller 109 that generates electricity from the flow of water through the screen intake's outlet 230. In general, the self-charging components for the power supply 107 can include, but are not restricted to, surface solar cells, pinwheel, wave action actuators, or any non-electrical or mechanical source of power to activate the pump 104, agitator 106, heater 108, and the like.

Figure 12:
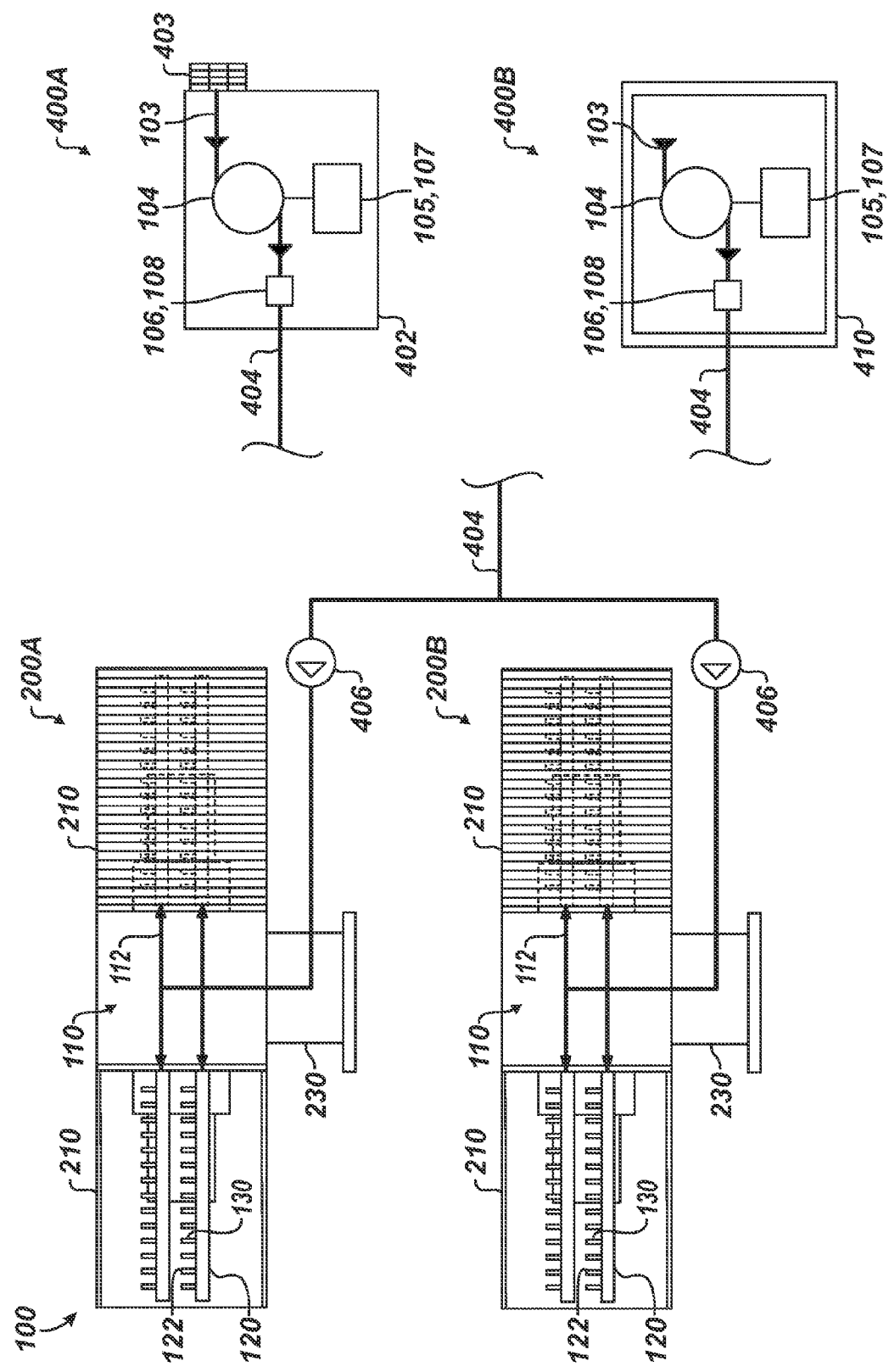
FIG. 12 shows a submerged screen cleaning system according to the present disclosure having remote submerged components for a screen intake system.

As hinted to above, the submerged components of the cleaning system 100 as in FIGS. 11A-11B do not need to be incorporated into the screen intake 200. For example, FIG. 12 shows a submerged screen cleaning system 100 according to the present disclosure having remote submerged components for the screen intake system. As shown by remote system 400A, the pump 104, agitator 106, heater 108, and related equipment can be submerged in the body of water near one or more screen intakes 200A-B. Using valves 406 on interconnected piping 404, the remote system 400A can be operated to separately or concurrently clean one or more of the screen intakes 200A-B of the water intake system.

In this remote system 400A, the pump 104 is submerged in a protective housing 402 in the lake, river, or other body of water, and a separate screen 403 is disposed near the pump's intake 103 to protect the pump 104 from taking in debris during operation. In fact, the entire protective housing 402 or a portion thereof may comprise the screen 403. Thus, the pump's screen 403 is separate from, and can be different dimensionally from, the screens 210 that the system 400A is cleaning. Just as the pump 104 and related components can clean the screens 210 of the screen intakes 200A-B, these components may also be used to clean the pump's screen 403 by using separate valves, pipes, etc. (not shown).

In another embodiment as shown by the remote system 400B, the pump 104 and related components can be submerged in a storage tank or reservoir 410 disposed in the body or water or onshore. In this arrangement, filtered water or other cleaning liquid in the tank or reservoir 410 is used by the pump 104 to deliver the pulsed cleaning liquid to the screen intakes 200A-B. Because the liquid is already filtered, the pump 104 for this system 400B may not need a separate screen or filter.

The foregoing description of preferred and other embodiments is not intended to limit or restrict the scope or applicability of the inventive concepts conceived of by the Applicants. Although the system 100 is described for use with a cylindrical screen and flat screen, the screen need not be strictly cylindrical or flat and may actually be curved either longitudinally, laterally, or both. In addition, the system 100 has been described as using valves or flow control devices as agitators 106 associated with the pump 104 and valves or flow control devices 114 associated with the manifold 110. Either one or both of these components 106 and 114 may be used in a given implementation to control the pumped liquid and provide a variable pulsing flow.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A screen intake apparatus disposed in a body of water, the apparatus comprising:
    a screen intake configured for direct submergence in the body of water, the screen intake including at least one screen having an exterior exposed to the body of water and defining an interior of the screen intake in fluid communication with a water intake, the screen screening passage of the water from the body to the water intake;
    at least one pipe disposed in the interior of the screen intake and in fluid communication with pumped cleaning liquid;
    at least one controllable flow device in fluid communication with the pumped cleaning liquid and the at least one pipe, and configured to create a variable pulsing flow of the pumped cleaning liquid for delivery to the at least one pipe;
    a controller controlling the at least one controllable flow device for varying the pulsing of the flow of the pumped cleaning liquid;
    connective piping delivering the varying pulsed pumped cleaning liquid from the at least one controllable flow device to the at least one pipe; and
    at least one outlet disposed on the at least one pipe and directing the pumped cleaning liquid from the at least one pipe into the interior of the screen intake, so as to produce an agitated or turbulent flow of the pumped cleaning liquid within the interior of the screen intake with the screen intake remaining submerged in the body of water such that the agitated or turbulent flow serves to clear debris collected on the exterior of the screen as the exterior remains exposed to the body of water.

2. The apparatus of claim 1, further comprising a pump pumping the cleaning liquid for delivery to the at least one pipe.

3. The apparatus of claim 2, wherein the pump is submerged in the body of water and comprises a pump intake in fluid communication with the water as the cleaning liquid.

4. The apparatus of claim 3, wherein the pump intake comprises a screen filtering the intake of the water.

5. The apparatus of claim 2, wherein the pump is submerged in a reservoir containing the cleaning liquid.

6. The apparatus of claim 2, wherein the pump is housed in the screen intake or is disposed in a housing attached to the screen intake.

7. The apparatus of claim 2, further comprising a power source connected to the pump and being self-charging.

8. The apparatus of claim 1, wherein the at least one pipe comprises a plurality of pipes; and wherein each of the pipes comprises a controllable flow device associated therewith for controlling delivery of the pumped cleaning liquid to the associated pipe.

9. The apparatus of claim 8, wherein the controllable flow devices sequentially deliver the pumped cleaning liquid to the associated pipes.

10. The apparatus of claim 8, wherein each of the controllable flow devices open in response to a same or a different pressure threshold.

11. The apparatus of claim 1, further comprising a heater in communication with pumped cleaning liquid and heating the pumped cleaning liquid communicated to the at least one pipe.

12. The apparatus of claim 11, wherein the cleaning liquid is water, and wherein the heater is adapted to heat the water to produce heated water, steam, or both.

13. The apparatus of claim 1, wherein the at least one pipe comprises a plurality of pipes; and wherein the apparatus further comprises a manifold receiving the varying pulsed pumped cleaning liquid from the connective piping and delivering the pumped cleaning liquid to the pipes.

14. The apparatus of claim 1, wherein the screen is cylindrical; and wherein the at least one pipe comprise a plurality of pipes distributed concentrically in the interior of the screen intake.

15. The apparatus of claim 1, wherein the screen is flat; and wherein the at least one pipe comprise a plurality of pipes arranged in a plane adjacent the screen.

16. The apparatus of claim 1, wherein the at least one outlet comprises at least one aperture defined in the at least one pipe.

17. The apparatus of claim 1, wherein the at least one outlet comprises at least one nozzle attached to the at least one pipe.

18. The apparatus of claim 17, wherein the at least one nozzle is pivotable on the at least one pipe.

19. The apparatus of claim 1, wherein the at least one outlet on the at least one pipe comprises a plurality of outlets unevenly spaced along a length of the at least one pipe.

20. The apparatus of claim 1, wherein the at least one outlet on the at least one pipe comprises a plurality of outlets and wherein: spacing between the outlets decreases toward a distal end of the at least one pipe, or sizes of the outlets increase toward the distal end of the at least one pipe, or an internal diameter of the at least one pipe decreases toward the distal end.

21. The apparatus of claim 1, wherein the at least one pipe comprises a plurality of pipes, wherein the at least one outlet comprises a plurality of outlets on the pipes, and wherein the pipes and outlets create agitating flow of the pumped cleaning liquid inside the interior of the screen intake and passing out from the exterior of the screen.

22. The apparatus of claim 1, wherein the at least one outlet comprise a plurality of outlets disposed in different directions along a length of the at least one pipe.

23. The apparatus of claim 1, wherein the at least one pipe comprises a plurality of pipes disposed at different distances from an inside surface of the screen.

24. The apparatus of claim 1, further comprising a connection selectively connecting the at least one pipe to a source of compressed air, whereby the at least one outlet directs a burst of the compressed air released from the source.

25. A screen debris cleaning method, comprising:
pumping cleaning liquid;
delivering the pumped cleaning liquid to a screen intake submerged in a body of water, the screen intake including at least one screen having an exterior exposed to the body of water;
distributing the delivered cleaning liquid to an interior of the screen intake using one or more pipes arranged in the interior of the screen intake;
pulsing flow of the pumped cleaning liquid for delivery to the interior of the screen intake;
varying the pulsing of the flow of the pumped cleaning liquid by a controllable flow device under the direction of a controller;
delivering the varying pulsed pumped cleaning liquid to the one or more pipes; and
directing the distributed cleaning liquid in the interior of the screen intake using one or more outlets disposed on the one or more pipes, so as to produce a turbulent flow of the pumped cleaning liquid within the interior of the screen intake as the screen intake remains submerged in the body of water with the exterior exposed to the body of water, the turbulent flow serving to clear debris collected on the exterior of the screen.

26. The apparatus of claim 1, wherein:
the at least one controllable flow device pulses the flow of the pumped cleaning liquid during a time period; and
the controller randomly or steadily varies the pulsing flow of the pumped cleaning liquid during the time period.

27. The method of claim 25, wherein:
pulsing the flow of the pumped cleaning liquid comprises pulsing the flow of the pumped cleaning liquid during a time period; and
varying the pulsing flow of the pumped cleaning liquid comprises randomly or steadily varying the pulsing flow of the pumped cleaning liquid during the time period.

28. The apparatus of claim 1, wherein the controllable flow device is an agitator configured to vary the pulsing flow of the pumped liquid, and wherein the agitator comprises a flapper and/or an elastic expansion balloon.

29. The apparatus of claim 1, wherein the at least one pipe comprises one or more reducers, and wherein an internal diameter of the at least one pipe decreases toward a distal end of the at least one pipe.

30. The apparatus of claim 18, wherein the at least one nozzle further comprises a ball end and a nozzle end, wherein the at least one nozzle is further configured to randomly spray the pumped cleaning liquid.

31. The method of claim 25, wherein directing the distributed cleaning liquid further comprises producing turbulent or whirling flow of the distributed cleaning liquid inside the interior of the screen intake.

32. The apparatus of claim 1, wherein the controllable flow device comprises an agitator.

33. The method of claim 25, wherein the controllable flow device comprises an agitator.

* * * * *